United States Patent Office 3,323,086
Patented May 30, 1967

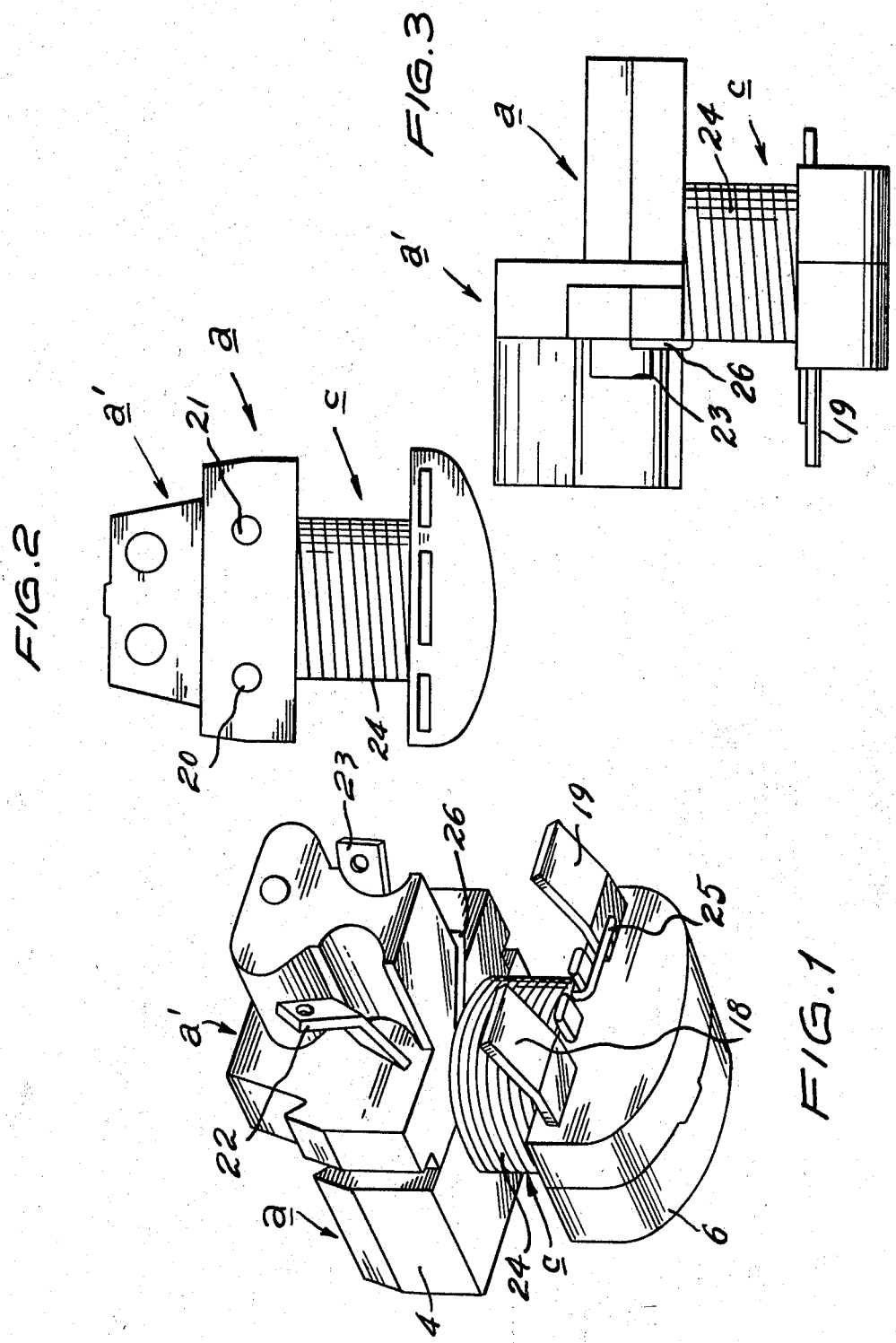

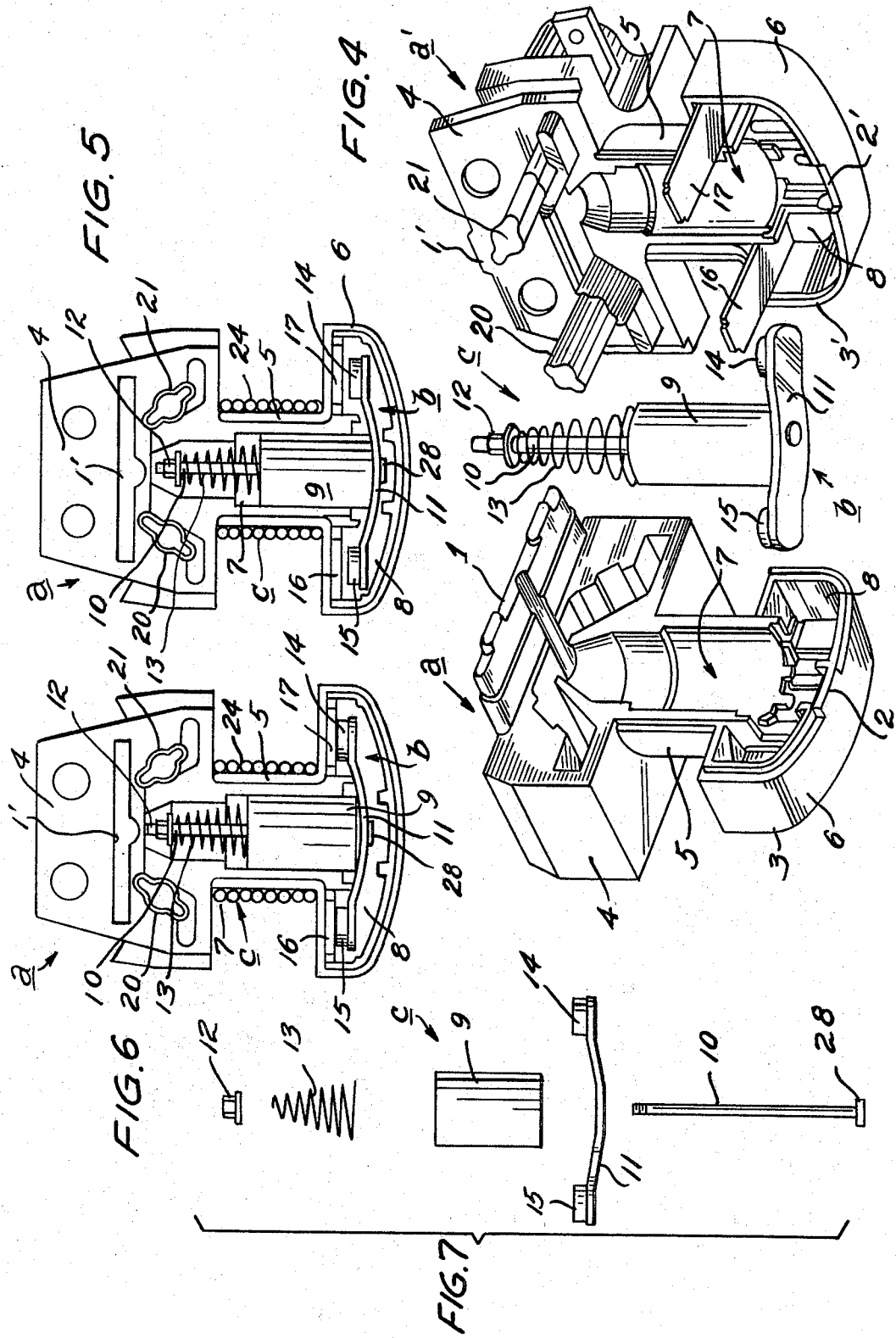

3,323,086
SOLENOID TYPE RELAY WITH TWO PIECE HOUSING HELD TOGETHER WITH THE COIL
Daniel R. Pimentel, Seekonk, Mass., assignor to Texas Instruments Incorporated, Dallas, Tex., a corporation of Delaware
Filed May 3, 1965, Ser. No. 452,599
7 Claims. (Cl. 335—202)

This invention relates to improved relays and in particular to an electro-magnetic relay of the type especially useful for electric motors, and particularly motors for compressors of refrigerating equipment. Relays of this type are known as starting relays, which function to connect the start winding with its electrical power source for a brief time, thus allowing the starting of a single-phase motor.

In general, relay devices of this type are integrated by a unit providing means for the assembly thereof and in a direct manner to the housing of the motor of the refrigerator equipment, the unit being interconnected with the winding of the motor and between those of the electric current mains.

Generally, the relay device of this type consists of a supporting structure on which an electro-magnet is mounted which governs a switch located between the start winding of the motor and its electrical power source, in order to provide the means for allowing the start winding of the motor to be energized during the period in which the motor is accelerating to operating speed.

Among the objects of the invention may be noted the provision of relay devices which are small in physical size of the type particularly, though not solely, useful as start winding relays for single-phase electrical motors; the provision of devices of the class described which are simple, rugged and reliable and which are particularly well suited for low cost assembly; the provision of solenoid type relays which employ a minimum number of parts of a type which facilitate assembly and decrease labor incident thereto.

In the prior art relays, the structure supporting the mechanisms contained therein is generally integrated by several parts which require a reciprocal relation by means of screws or equivalent means, thereby increasing the cost of the final product because, apart from the intrinsic cost of manufacture of these joining elements, they require as well hand labor for their assembly.

In the relay of the instant invention, the self-supporting structure comprises only two parts, the reciprocal interrelation being attained exclusively by means of assembling elements which are held together by joining the two parts of the structure which are shell like in form by means of the wire constituting the coil of the electromagnet.

More specifically, the supporting structure comprises an assembly consisting of three portions, a head, a neck, and a body, forming a unit divided in two halves associated with each other by means of reciprocal assembly with the internal mechanism of the relay located in the joining faces thereof.

These faces comprise concavities that, confronted and assembled, form two chambers at right angles, interconnected, one placed along the neck and the other in the body. The first of these chambers houses an axially displaceable iron plunger related to a movable metallic contact plate placed within the second chamber and adapted to contact two terminals which penetrate and support internal connections confronting the plate within the chamber housing it, the external terminals thereof leading out of the chamber. One of these terminals is connected to one end of a coil and this, wound around the neck of the structure, constitutes the element retaining both halves together. The external terminals may be joined to the coil in different ways, according to the uses to be given to the relay. For instance, the other end of the coil may be connected to a terminal of a second pair of conductors, mounted in the head of the structure and that may be related, furthermore, to the electric current distribution mains, and to the electric supply conductors of the appliance to which the relay is connected.

The invention in the preceding paragraphs has been discussed in a general manner, giving an idea of the improvement afforded.

The invention accordingly comprises the elements and combinations of elements, features of construction, and arrangements of parts which will be exemplified in the structures hereinafter described, and the scope of the application of which will be indicated in the following claims.

In the accompanying drawings, in which one of the various possible embodiments of the invention is illustrated:

FIG. 1 represents a general perspective view of the relay of the invention;

FIG. 2 indicates a front view of the relay;

FIG. 3 illustrates a side view of the relay;

FIG. 4 is a perspective, and shows that the structure comprises two halves, one assembled to the other, and housing between them the movable elements of the electro-magnet, the halves being reciprocally joined by means of the coil;

FIGS. 5 and 6, by means of corresponding longitudinal sections, indicate the position of the movable elements when the circuit is open and when the circuit is closed respectively; and FIG. 7 shows in perspective the components of the movable elements of the electro-magnet.

In all the figures the same numbers indicate corresponding parts.

According to what is shown in the above-referred-to figures, the device of the invention consists of a supporting structure $a$, $a'$ formed of an electrically insulating material such as a phenolic resin and which may be conveniently molded and the switch $b$ operated by the electro-magnet $c$.

The supporting structure is integrated by the two halves $a$ and $a'$ in FIG. 4 comprising reciprocal assembling elements, such as projections 1, 2, 3 provided in half $a$ and which are housed in recesses 1', 2', 3' of half $a'$.

When both halves are interconnected, as in FIGS. 1, 2 and 3, a head 4, a neck 5 and a body 6 are formed, the inside hollowing in each of them being formed by the joining of the cavities of each half.

Along the neck 5 the above-mentioned hollowing forms a chamber 7 which is continued to head 4 and connects with a transversally extending chamber 8 located in the interior of body 6. Inside the first chamber an axially bored cylindrical plunger 9 formed of a magnetically responsive material is slidably mounted on a guide rod 10 which, at one end, is slidably attached to an electrically conductive contact plate 11, and at the other end terminates in a cap 12 which retains spring 13 mounted on rod 10 between cap 12 and plunger 9, forcing the plunger against plate 11. Plate 11 is elongated and movable within chamber 8 and at each end has respective contacts 14, 15 fixed thereto in electrically conductive relation facing and adapted to engage the internal terminals 16, 17 of electrical conductors leading through the walls of body 6 to the exterior, forming terminals 18, 19, as shown in FIG. 1. If desired, terminals 16, 17 may be provided with contact buttons (not shown).

Head 4 comprises transversally extending apertures housing the small metallic tubes 20, 21 ending with terminals 22, 23, as also shown in FIG. 1, located near the said terminals 18, 19. Tubes 20, 21 conveniently form pin connectors which are located between halves a, a'.

The two halves a, a' of the structure are mounted, as shown in FIGS. 1, 2 and 3, by means of the reciprocal assembly of elements 1, 2, 3 and 1', 2', 3', the union of the two halves being retained by wire 24 of the coil wound around the neck 5.

Wire 24, thus wound, constitutes the coil, one end 25 of which is joined to terminal 19, see FIG. 1, the other end 26 being joined to terminal 23, see FIGS. 1 and 3.

Although many variants are possible one circuit for the particular embodiment illustrated may be described as follows. Terminal 18 is electrically connected to terminal 22, as by soldering a suitable lead to the terminals. Terminal 19 is used as a common terminal and electrically connected on the one hand to lead 25 of wire 24, lead 26, terminal 23, connector 20 to the pin (not shown) in connector 20, to the running winding of the motor; on the other hand terminal 19 is electrically connected to terminal 16, contact 15, contact plate 11, contact 14, terminal 17, through the lead (not shown) to terminal 18, terminal 22, connector 21 to the pin (not shown) in connector 21 to the start winding of the motor.

Regarding the operation of the device, it will be understood that a sufficient electric current through coil 24 will generate a magnetic force that will attract plunger 9, which will move in a longitudinal direction, compressing spring 13 so that, by reaction, the upper end thereby will press against cap 12 and rod 10. The bottom end of said rod 10 includes a flange 28 which supports plate 11, so that contact plate 11 will move with rod 10 in its ascending movement until contacts 14, 15 connect with terminals 16, 17, closing the circuit as shown in FIG. 6.

Provision has been made to minimize contact bounce which can be associated with large variations in coil current. At coil currents close to the relay pickup valve a soft spring will give best results while at high coil currents a stiff spring gives best results. Spring 13 is of a variable rate design which displays both desired characteristics thereby minimizing any contact bounce tendencies.

When the current ceases to pass through the circuit in which coil 24 is included, or when said current decreases to a predetermined level, the magnetic attraction on plunger 9 will cease, or diminish to said predetermined level, thereby permitting gravity to pull plunger 9 and contact plate 11 therewith, downwardly, thereby opening the circuit which was closed by the connection between the elements 15, 16 and 14, 17 as shown in FIG. 5.

The invention thus described may be easily unuderstood by those with knowledge in the art, and should not require further explanation.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:
1. An electric relay housing comprising:
   (a) first and second interfitting electrically insulating sections;
   (b) each section defining a head portion, a neck portion and a body portion; a cavity being located in said neck portion extending from said head portion, to said body portion and extending transversely in said body portion for the reception of a plunger and contact plate assembly;
   (c) terminal slots formed in said sections extending from inside said cavity through said housing;
   (d) terminal means received and locked in said slots; and
   (e) electrically conductive wire wound around said first and second sections holding said sections together, said wire connected to said terminal means.

2. A relay according to claim 1 in which portions of said terminal means are shaped to form pin connectors which are aligned with slots in one of said sections.

3. A relay according to claim 2 in which projections are provided in said first section and interdigitating recesses are provided in said second section.

4. A relay according to claim 3 in which said pin connectors are located in said head portion.

5. A relay according to claim 4 including movable contact means mounted in said cavity and movable into and out of engagement with said terminal means; a magnetically responsive plunger slidably mounted in said cavity and adapted to move said contact means into engagement with said terminal means upon a predetermined current value in the wound wire; spring means tending to bias said contact means out of engagement with said terminal means.

6. Electrical relay comprising:
   (a) a housing of electrically insulating material having first and second sections which interfit and each of which form a head portion; a neck portion and a body portion; a cavity formed in each neck portion which extends from said head portion to said body portion and connects with a cavity formed in said body portions which extends transverse to said neck portion cavity;
   (b) projections provided in said first section;
   (c) recesses provided in said second section which interdigitate with said projections;
   (d) head terminal slots formed in said head portions and extending from inside the cavity through the housing;
   (e) head terminal means received and locked in said slots;
   (f) body terminal seating means formed in said body portion of said first section;
   (g) body terminal slots formed in said body portion in said second section and aligned with said seating means;
   (h) body terminal means received in said body seating means and extending through said body terminal slots and locked therein;
   (i) electrically conductive wire wound around said neck portions fixedly holding said sections together, one end thereof attached to one of said head terminals, the other end thereof attached to one of said body terminals;
   (j) a longitudinal member located in said neck cavity provided with abutment means on both ends;
   (k) an electrically conductive contact plate slidably supported on said longitudinal member adjacent one of said abutment means and adapted to engage said body terminals;
   (l) a magnetically responsive plunger element slidably mounted on said longitudinal member and adjacent said contact plate; and (m) variable rate spring means mounted between said plunger and the other of said abutment means whereby a predetermined current in the wire wound around said neck portions will create magnetic force which will cause said contact plates to engage said body terminals.

7. An electric relay according to claim 6 in which a portion of each head terminal is bent in a tubular configuration, said configuration presenting pin connectors which are aligned with slots in one of said head portions.

References Cited

UNITED STATES PATENTS

| 2,891,124 | 6/1959 | Vaughan | 200—122 |
| 3,099,725 | 7/1963 | Grenier | 200—111 X |
| 3,238,327 | 3/1966 | Koppensteiner | 200—87 |

BERNARD A. GILHEANY, *Primary Examiner.*

R. N. ENVALL, JR., *Assistant Examiner.*